July 20, 1926.
M. H. KIPP
CLUTCH PEDAL ATTACHMENT
Filed March 13, 1925
1,593,338
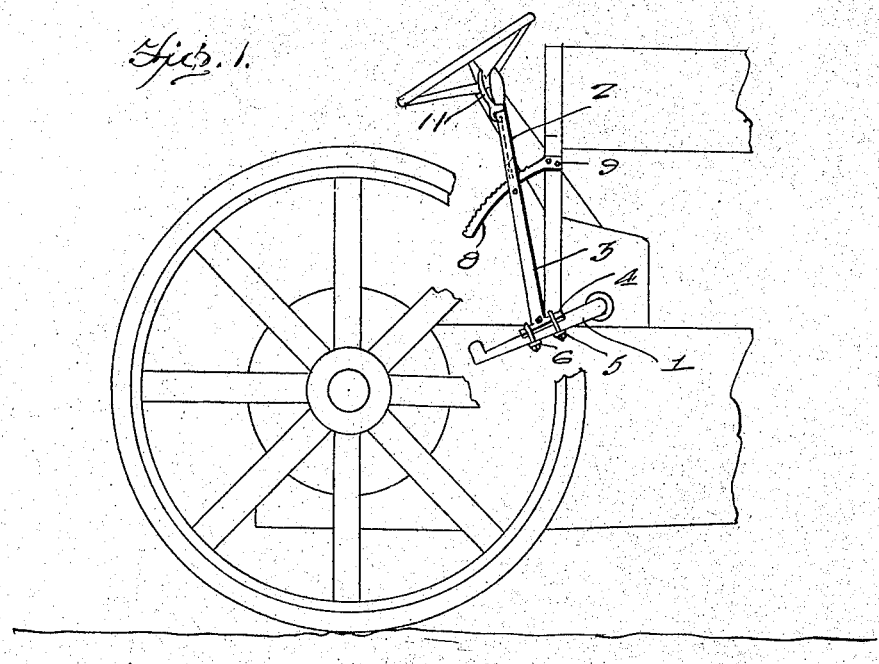
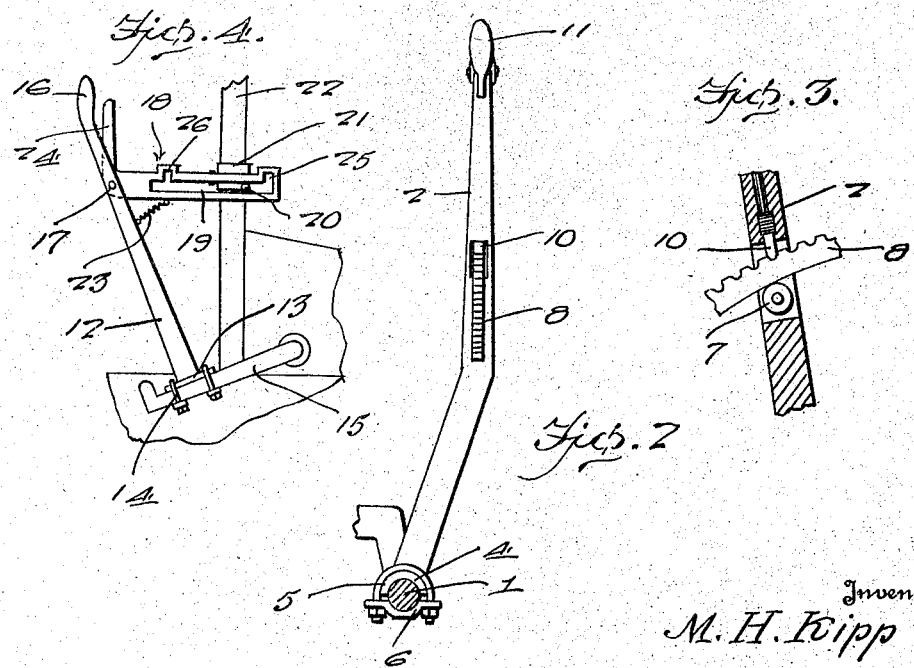
Inventor
M. H. Kipp

Patented July 20, 1926.

1,593,338

UNITED STATES PATENT OFFICE.

MANUEL H. KIPP, OF FLANDREAU, SOUTH DAKOTA.

CLUTCH-PEDAL ATTACHMENT.

Application filed March 13, 1925. Serial No. 15,287.

This invention relates to an improved attachment for a clutch pedal of the type employed upon tractors of the Fordson type.

The invention has more particular reference to an attachment which serves to securely maintain the pedal in its depressed position for disengaging the clutch and permitting independent rotation of the engine shaft with respect to the propeller shaft.

More specifically, the invention comprises a handle which is detachably connected to the pedal so that it will move with the pedal as it is raised and lowered, novel releasable means being associated with the handle and a relatively stationary part of the vehicle for securely holding the pedal in its depressed state or in its elevated position.

In connection with maintaining the pedal in its elevated position, an important advantage is derived in that it permits the pedal to serve as a foot rest for the operator and prevents accidental, or in fact, any depression of the pedals so as to prevent possible dragging of the clutch and resultant wear.

Other advantages and features will become apparent from the following description and drawing.

In the accompanying drawing forming a part of this application, and in which like numerals are employed to designate like parts throughout the same:

Figure 1 is a side elevation of a fragment of a tractor of the type specified showing the clutch pedal with the improved attachment associated therewith.

Fig. 2 is an enlarged sectional view showing the method of connection of the handle to the pedal.

Fig. 3 is a detail sectional and elevational view showing a pawl and ratchet construction constituting a part of the invention.

Fig. 4 is a view similar to Fig. 1, showing a slightly different embodiment of the invention.

Referring to the drawing in detail, the reference character 1 designates the oscillatory clutch pedal of the kind used upon a tractor of the Fordson type. As is well known, when this pedal is depressed, the clutch, which is controlled, is disengaged to permit idling of the engine shaft. When it is released, however, the clutch is automatically engaged to couple the propeller shaft to the engine shaft.

It is frequently desirable to permit independent rotation of the engine shaft for deriving belt power therefrom for operating other machinery and at the same time holding the clutch released. Of course, I am aware that numerous devices have been provided for maintaining a clutch pedal in a depressed state, at the same time, as far as I am aware, none are as satisfactory as might be.

Hence the structural improvement which I have evolved and produced to accomplish this primary purpose. The invention is shown in two embodiments and attention is first directed to Figs. 1 to 3 inclusive wherein one embodiment is shown.

Noting these figures, it will be seen that a handle is provided, the lower end portion 3 being offset as shown in Fig. 2 and the extremity being provided with a semi-circular seat 4 for reception of the upper half of the cylindrical portion of the pedal 1. U-bolts 5 are passed over this seat and are connected with clamping plates 6, thus securely connecting the handle to the pedal. Between its ends, as more clearly shown in Fig. 3, the handle is provided with an elongated slot and an anti-friction roller 7 is rotated in this slot. Also as shown here, an arcuate toothed rack bar 8 extends therethrough and contacts the roller. Observing now Fig. 1, it will be seen that the upper end of this rack bar is secured as at 9 to a relatively stationary part of the tractor. It will also be noted that the bar curves downwardly, the arc being consistent with the arc traversed by the swing of the pedal so as to prevent possible interference of the attachment with the free reciprocation of the pedal.

It will also be noted from Fig. 3 that a spring pressed pawl 10 is carried by the handle and is adapted to be collectively engaged with the teeth on the rack bar, this pawl being controlled by a pivoted hand piece 11 at the top of the handle.

From the foregoing it will be seen that when the pedal is to be depressed, the foot is placed thereon in the usual way and the pedal is pushed downwardly, the handle 2 being pulled downward after releasing the pawl. When the pedal is in the lowermost position and the clutch released, the pawl may then be released and engaged with the teeth of the rack bar to maintain the pedal in its depressed state. On returning the pedal, the under side of the rack bar acts somewhat as a cam, the anti-friction roller riding upwardly on the same and preventing too quick a return of the pedal and possible choking of the motor.

When the pedal reaches its uppermost position to thoroughly release the clutch, the pawl engages the rack bar to maintain the pedal in this position. At this time the pedal comes to a firm foot rest for the operator's foot and considerable weight can be placed thereon without fearng depression of the pedal and dragging of the clutch. This is an important feature upon which stress is to be laid.

The device shown in Fig. 4 accomplishes somewhat the same result. Attention, being confined to this figure it will be seen that the handle 12 is provided with a foot 13 clamped by bolt 14 upon the pedal 15. The upper end of the handle is provided with an appropriate hand grip 16. Pivoted at 17 below the hand grip is a slotted link 18. Extending through the slot 19 in this link is a projection 20 carried by a collar 21 clamped or secured upon the body 22. The link is maintained in yieldable contact with this projection through the medium of an appropriate spring 23. Also the link may be rocked by the angular extension 24. At its opposite ends the link is provided with notches 25 and 26 constituting two seats.

Obviously when the pedal is depressed, the pin or projection 20 is seated in the notch 25 and when the pedal is in its uppermost position, the pin is seated in the notch 26. So, it will be seen that the pedal will be firmly held in either of the two positions specified. Obviously, in order to permit movement of the handle, the angular extension 24 must be grasped to rock the link about its pivot.

It is thought that the foregoing description taken in connection with the drawings, will enable persons skilled in the art to which the invention relates to obtain a clear understanding of the same. For this reason a more lengthy description is thought unnecessary.

While the preferred embodiment of the invention has been shown and described, it is to be understood that minor changes coming within the field of invention claimed, may be resorted to if desired.

Having thus described my invention. what I claim as new is:—

In a vehicle structure of the class ascribed, a clutch operating pedal, a handle rigidly extending from the clutch operating pedal at an angle thereto and upwardly therefrom, an extension provided on the vehicle, a link having a slotted body portion and an angularly disposed handle portion, means for pivoting the link to the handle so that said handle portion is normally disposed forwardly of said handle, said slotted body being provided with notches at its ends rising from the slots, said extension being disposed in said slots for engaging with said notches.

In testimony whereof I affix my signature.

MANUEL H. KIPP.